Sept. 6, 1932.  E. L. LANGDON  1,875,876
DENTAL VULCANIZER
Filed April 7, 1930
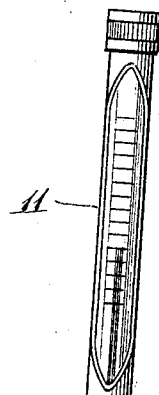
Fig.1.
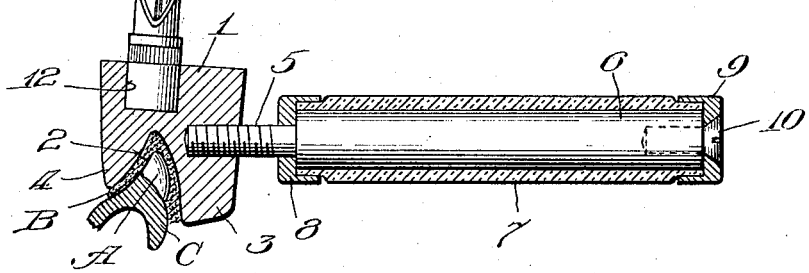
Fig.2.
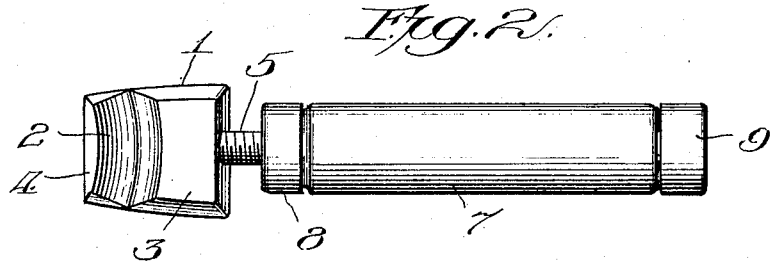
Fig.3.
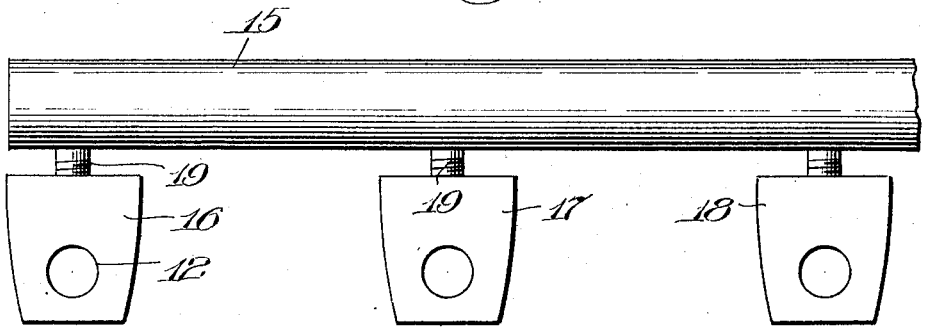
Inventor:
E. L. Langdon,
Wm. F. Freudenreich,
Atty Patented Sept. 6, 1932

1,875,876

UNITED STATES PATENT OFFICE

EDWIN L. LANGDON, OF CHICAGO, ILLINOIS

DENTAL VULCANIZER

Application filed April 7, 1930. Serial No. 442,054.

The present invention relates particularly to vulcanizing means for repairing artificial dental work such as plates, partial plates and bridges. Up to the present time, so far as I am aware, it has been necessary to place the entire plate into a vulcanizer in the event that it has been necessary to replace a tooth or repair a small part of the plate adjacent to a tooth. Under this old practice the body of the plate, which has already been vulcanized, is subjected to a second treatment that would originally have vulcanized it, thereby producing such a deterioration in the plate that it will be fragile and brittle. Furthermore, under the old practice, the plate will be blackened and the article, as a whole, will be greatly depreciated in appearance and quality. The old process requires three or four hours to complete the work, and therefore a busy workman operating in plate work and the like must have a considerable number of comparatively expensive vulcanizers. These prior vulcanizers are steam heated, thereby requiring the care and attention of apparatus for which steam must be generated.

The object of the present invention is to make it possible successively to effect local vulcanization of a small part only of a plate or a small tooth-supporting section, or of a small body of vulcanizable material at the base of a tooth or two in any structure on which one or more teeth are mounted.

While my invention is, of course, particularly applicable to dental work, it is not necessarily limited to that field, and may therefore be said to have for its object to produce a simple and novel form of small vulcanizer.

In carrying out my invention, I employ a block of heat-conductive material, preferably metal, having therein a recess to receive a tooth, or a few teeth, and the adjacent section of the tooth-supporting means, together with a covering of plaster of Paris or other material of a type that is or may be used in vulcanizing plates or the like. The heat is not applied directly to the block, but through a member of comparatively small cross-sectional area intimately engaged with the material of the block; thereby preventing too rapid temperature changes and making it easy to control the temperature. A thermometer is associated with the block, and it is preferably readily detachable so that, at the end of the vulcanizing operation, the thermometer may be removed and the vulcanizer and the work be dipped in water or held under a faucet so as quickly to cool the same.

By using a small vulcanizer, the vulcanizing may be done in one-fourth or one-half the time heretofore required. Also, because of the manner in which the instrument and the work may be cooled, almost all of the time heretofore required for the slow cooling of a re-vulcanized plate is saved. Therefore, viewed in one of its aspects, the present invention may be said to have for its object to make it possible not only to produce a better quality of work than has heretofore been the case in vulcanizing small bodies or small portions of large bodies and effect a saving in the time of assembling, but also greatly to reduce the time required to complete the job after the heat has been turned on.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a longitudinal section through a device arranged in accordance with one form of my invention, applied to a piece of work; Fig. 2 is an elevation of the device itself, looking up from the under side of Fig. 1; and Fig. 3 is a top plan view of a multiple vulcanizer.

Referring to Figs. 1 and 2 of the drawing, 1 represents a heavy block, preferably of metal, having in one side a trough or notch 2 extending entirely across the same. The trough or notch is preferably more or less V-shaped so that when a tooth, such as is indicated at A, is set into the same, there is left between the tooth and the body of the block a space that may be filled with a layer B, of substantial uniform thickness, of plaster of Paris or the like. The notch is sufficiently deep so that when the tooth is introduced into the same, the adjacent part of the plate C or other support is also partially entered in the notch. Ordinarily the vulcanizer must be longer on the outer side of the teeth than on the inner side, and therefore the section 3 of the block bounding one side of the notch or trough may project out farther than the section 4 that bounds the other side. The notch or trough is preferably made as long as the width of two or three ordinary teeth and is curved in the direction of its length so as to follow, in a general way, the line of the teeth in the jaw.

The heat for vulcanizing is applied or generated beyond the body of the block, in a suitable way, and is transmitted to the block through a suitable heat interchanger. In the arrangement shown, there is a heating element connected to the block by means of a stem 5 of comparatively small cross-sectional area, screwed at one end into the block. The heating element may take any desired form. In the arrangement shown, the heating element is simply a device adapted to receive heat from an external source, and having considerable heat capacity; thereby producing a regular flow of heat from the element to the block. The particular heating device illustrated consists of a long cylindrical piece of metal 6, of considerable diameter, integral with the stem 5, and surrounded by a sleeve 7 of porcelain or other refractory material. The sleeve may be held in place by a cup-shaped nut 8 screwed on the stem 5 and fitting over one end of the sleeve, together with a cap 9 fitted over the other end of the sleeve and held to the member 6 by means of a screw 10 or otherwise.

In using this particular embodiment of my invention, the heating element of the vulcanizer, with the work properly held in the block, is positioned over a Bunsen burner. The heating element absorbs heat from the burner and transmits it through the stem to the block.

It is of course necessary to control and accurately regulate the temperature to which the work is subjected. This can best be accomplished by associating with the block or head a suitable thermometer. In using the device, the burner is turned on until the thermometer indicates the temperature approaching the maximum temperature desired, and then the burner is turned down more or less; experience soon teaching the user how to adjust the burner in order to maintain a substantially uniform temperature for the required length of time. I have found that, with little practice, the burner may be adjusted after it has been turned on for ten or fifteen minutes and thereafter be given no further attention until it is time to turn off the heat completely.

In the arrangement shown, there is a thermometer 11 set into a pocket 12 in the side of the block or head opposite that having the trough or notch; the thermometer being preferably a sufficiently tight fit that it will not accidentally drop out. With this arrangement, at the end of the vulcanizing process, the thermometer is removed and the vulcanizer and the work are immersed in water or held under a water faucet so as to be quickly cooled.

It will be seen that the vulcanizing heat is applied only locally, so that a plate, for example, will not be discolored or warped or be caused to deteriorate structurally due to repairing one or a few teeth or a small section of the rubber or other plate material. I have referred only to the use of my improved device in connection with plates or partial plates, but there are of course various other uses therefor in the dental field.

It will be seen that only a small amount of plaster of Paris or the like is required, thereby effecting a considerable saving over the old process; so that, in addition to producing better results than have heretofore been possible, there is also a saving of material as well as a saving of time in preparing the work for treatment, in treating it, and in the final cooling. It will also be seen that in its simple form, adapted to take up heat from an external source, the device consists of only a few rugged parts; so that the device is inexpensive and at the same time durable.

If desired, there may be a plurality of vulcanizing heads or blocks connected with a single heating element. Thus I have shown in Fig. 3 a long heating element 15 to which are connected three blocks or heads 16, 17 and 18; there being a heat interchanging member 19 of small cross-sectional area between the heating element and each of the vulcanizing blocks or heads.

While I have illustrated and described with particularity only a single preferred form of my invention, with a slight modification, I do not desire to be limited to the exact structural details thus illustrated and described; but intend to cover all forms and arrangements which come within the definitions of my invention constituting the appended claims.

I claim:

1. A vulcanizing device comprising a block of metal adapted to engage the work, and a pocket for one end of a thermometer, a thermometer detachably seated in said pocket, a heating element near and spaced apart from the block, and a heat-conductive connection of small cross-sectional area compared to the head between said element and said block.

2. A vulcanizing device comprising a metal block having in one face a deep V-shaped notch extending entirely across the same, a heating element beside and near said block, and a heat-conductive member of comparatively small cross-sectional area connecting the said element and block.

3. A vulcanizing device comprising a metal block having in one face a deep V-shaped notch extending entirely across the same and in the opposite face a pocket to receive an end of a thermometer, a thermometer detachably entered in said pocket, a heating element beside and spaced apart from the block, and a member of heat-conductive material of comparatively small cross-sectional area connecting said block and said heating element.

4. A vulcanizing device comprising a heavy head member of heat-conductive material having in one side a V-shaped notch extending entirely across the same, a heating element beside and spaced apart from the head member, and a member of heat-conductive material of comparatively small cross-sectional area connecting said head member and said heating element together.

5. A vulcanizing device comprising a narrow block of heat-conductive material shaped to fit over only a small part of a complete row of teeth, and the corresponding gum section at the base of the teeth, and leave space for an interposed layer of plaster of Paris or the like, a heating element beside and spaced apart from the block, and a heat-conductive connection of small cross-sectional area compared to said block between the block and the head.

6. A vulcanizing device comprising a metal block having in one face a V-shaped groove extending entirely across the same, a heavy metal heating element, a member of comparatively small cross-sectional area connecting said heating element and said block, and a sleeve of refractory material over said heating element.

7. A vulcanizing device comprising a metal block having in one face a V-shaped groove extending entirely across the same, a heavy metal heating element, a member of comparatively small cross-sectional area connecting said heating element and said block, a sleeve of refractory material over said heating element, and a thermometer detachably connected to said block.

8. A vulcanizing device comprising a block of heat-conductive material adapted to engage the work, a heating element beside the block, and a heat interchanging member of small cross-sectional area between said element and the block.

In testimony whereof, I sign this specification.

EDWIN L. LANGDON.